United States Patent
Batzel

(10) Patent No.: US 6,441,572 B2
(45) Date of Patent: Aug. 27, 2002

(54) DETECTION OF ROTOR ANGLE IN A PERMANENT MAGNET SYNCHRONOUS MOTOR AT ZERO SPEED

(75) Inventor: Todd D. Batzel, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 09/738,279

(22) Filed: Dec. 14, 2000

Related U.S. Application Data

(60) Provisional application No. 60/170,623, filed on Dec. 14, 1999.

(51) Int. Cl.⁷ .................................................. H02P 6/18
(52) U.S. Cl. ........................ 318/254; 318/439; 318/721; 318/724
(58) Field of Search ................................ 318/138, 254, 318/439, 430, 431, 459, 500, 700, 720, 721, 722, 724; 388/909, 928.1

(56) References Cited

U.S. PATENT DOCUMENTS

| | | | | |
|---|---|---|---|---|
| 4,558,259 A | * | 12/1985 | Craig | 318/256 X |
| 5,117,165 A | | 5/1992 | Cassat et al. | 318/254 |
| 5,206,567 A | * | 4/1993 | Sakurai et al. | 318/439 X |
| 5,608,300 A | | 3/1997 | Kawabata et al. | 318/721 |
| 5,751,125 A | | 5/1998 | Weiss | 318/280 |
| 5,841,252 A | | 11/1998 | Dunfield | 318/254 |
| 5,854,548 A | | 12/1998 | Taga et al. | 318/721 |
| 5,973,469 A | * | 10/1999 | Higuchi et al. | 318/623 |

* cited by examiner

*Primary Examiner*—Bentsu Ro
(74) *Attorney, Agent, or Firm*—Ohlandt, Greeley, Ruggiero & Perle, L.L.P.

(57) ABSTRACT

The teachings herein comprise a method and apparatus for determining the position of a rotor by applying a voltage across a pair of phases of a motor and using a voltage measurement responsive to the applied voltage and indicative of the distribution of the phase inductances within the phase pair to which a test voltage is applied to determine the rotor position.

12 Claims, 17 Drawing Sheets

| MEASURED OPEN CIRCUIT VOLTAGE STATE | ROTOR ANGLE | |
|---|---|---|
| $v_{a+} > 0$ ; $v_{b+} > 0$ ; $v_{c+} < 0$ | 0° → 30° OR 180° → 210° | $\lvert v_{b+}\rvert > \lvert v_{a+}\rvert$ : 15° → 0° OR 180° → 195°<br>$\lvert v_{a+}\rvert > \lvert v_{b+}\rvert$ : 15° → 30° OR 195° → 210° |
| $v_{a+} > 0$ ; $v_{b+} < 0$ ; $v_{c+} < 0$ | 30° → 60° OR 210° → 240° | $\lvert v_{c+}\rvert > \lvert v_{b+}\rvert$ : 30° → 45° OR 210° → 225°<br>$\lvert v_{b+}\rvert > \lvert v_{c+}\rvert$ : 45° → 60° OR 225° → 240° |
| $v_{a+} > 0$ ; $v_{b+} < 0$ ; $v_{c+} > 0$ | 60° → 90° OR 240° → 270° | $\lvert v_{a+}\rvert > \lvert v_{c+}\rvert$ : 60° → 75° OR 240° → 255°<br>$\lvert v_{c+}\rvert > \lvert v_{a+}\rvert$ : 75° → 90° OR 255° → 270° |
| $v_{a+} < 0$ ; $v_{b+} < 0$ ; $v_{c+} > 0$ | 90° → 120° OR 270° → 300° | $\lvert v_{b+}\rvert > \lvert v_{a+}\rvert$ : 90° → 105° OR 270° → 285°<br>$\lvert v_{a+}\rvert > \lvert v_{b+}\rvert$ : 105° → 120° OR 285° → 300° |
| $v_{a+} < 0$ ; $v_{b+} > 0$ ; $v_{c+} > 0$ | 120° → 150° OR 300° → 330° | $\lvert v_{c+}\rvert > \lvert v_{b+}\rvert$ : 120° → 135° OR 300° → 315°<br>$\lvert v_{b+}\rvert > \lvert v_{c+}\rvert$ : 135° → 150° OR 315° → 330° |
| $v_{a+} < 0$ ; $v_{b+} > 0$ ; $v_{c+} < 0$ | 150° → 180° OR 330° → 360° | $\lvert v_{a+}\rvert > \lvert v_{c+}\rvert$ : 150° → 165° OR 330° → 345°<br>$\lvert v_{c+}\rvert > \lvert v_{a+}\rvert$ : 165° → 180° OR 345° → 360° |

FIG. 4

1) CH1: 200 VOLT 200 μs
2) CH2: 10 VOLT 200 μs

1) CH1: 200 VOLT 200 μs
2) CH2: 10 VOLT 200 μs

1) CH1:  200 VOLT 200 µs
2) CH2:  10 VOLT 200 µs

1) CH1:  200 VOLT 200 µs
2) CH2:  10 VOLT 200 µs

1) CH1: 200 VOLT 200 μs
2) CH2: 10 VOLT 200 μs

1) CH1: 200 VOLT 200 μs
2) CH2: 10 VOLT 200 μs

1) CH1: 200 VOLT 200 μs
2) CH2: 10 VOLT 200 μs

1) CH1: 200 VOLT 200 μs
2) CH2: 10 VOLT 200 μs

1) CH1: 200 VOLT 200 µs
2) CH2: 10 VOLT 200 µs

1) CH1: 200 VOLT 200 µs
2) CH2: 10 VOLT 200 µs

1) CH1: 200 VOLT 200 µs
2) CH2: 10 VOLT 200 µs

1) CH1: 200 VOLT 200 µs
2) CH2: 10 VOLT 200 µs

1) CH1:  200 VOLT 200 µs
2) CH2:  10 VOLT 200 µs

1) CH1:  200 VOLT 200 µs
2) CH2:  10 VOLT 200 µs

1) CH1: 200 VOLT 200 µs
2) CH2: 10 VOLT 200 µs

1) CH1: 200 VOLT 200 µs
2) CH2: 10 VOLT 200 µs

1) CH1: 200 VOLT 200 μs
2) CH2: 10 VOLT 200 μs

1) CH1: 200 VOLT 200 μs
2) CH2: 10 VOLT 200 μs

1) CH1: 200 VOLT 200 μs
2) CH2: 10 VOLT 200 μs

1) CH1: 200 VOLT 200 μs
2) CH2: 10 VOLT 200 μs

1) CH1: 200 VOLT 200 μs
2) CH2: 10 VOLT 200 μs

1) CH1: 200 VOLT 200 μs
2) CH2: 10 VOLT 200 μs

1) CH1: 200 VOLT 200 μs
2) CH2: 10 VOLT 200 μs

1) CH1: 200 VOLT 200 μs
2) CH2: 10 VOLT 200 μs

DETECTION OF ROTOR ANGLE IN A PERMANENT MAGNET SYNCHRONOUS MOTOR AT ZERO SPEED

This application claims priority of U.S. provisional patent application No. 60/170,623 filed on Dec. 14, 1999.

BACKGROUND OF THE INVENTION

1. Field of the Invention

The teachings herein relate to an electrical angle detecting apparatus and method and in particular, to an apparatus and method for detecting the electrical angle of a synchronous motor at zero speed without using commutation sensors.

2. Description of the Prior Art

Electrically commutated synchronous motors are used in various drive applications because of their desirable operating characteristics, such as, for example their high efficiency, high power-to-volume ratio, high torque-to-volume ratio, reliability, robust construction, and quiet operation. The rotor position (i.e., electrical angle) is needed to determine the commutation points necessary for initiating and continuing synchronous motor operation.

Conventional synchronous motor drives rely on rotor angle sensor circuitry such as Hall Effect sensors, resolvers or encoders to detect the rotor angle required for performing the commutation of the phase currents. The use of such feedback devices however presents a number disadvantages in many applications. For example, the use of a resolver or encoders tend to increase the physical size, weight, inertia, and cost of the motor. Furthermore, commutation sensors are prone to failure and decrease the reliability of the motor. Commutation sensors are especially prone to fail when used in operating environments subject to humidity, dust, high temperatures, and submersion.

Therefore, in order to eliminate the need for rotor position sensors, sensorless techniques for ascertaining the rotor position of motors have been developed. However, it is known that accurate, high resolution detection of the rotor position at standstill (i.e., non-rotating, zero speed) using sensorless techniques is difficult and problematic to perform. The results obtained by such techniques are often ambiguous as to the position of the rotor. Problems exist in detecting the rotor position at zero speed because there is no back emf to provide an indication of the commutation points. Furthermore, it is especially difficult to detect the rotor position, at standstill, for a round rotor or non-salient permanent motors.

In order to start a PMSM (permanent magnet synchronous motor) machine from a standstill position at full torque or to guarantee a dither free startup, knowledge of the initial rotor position is required. Thus, the startup of a sensorless drive motor using previously proposed techniques of rotor position detection can result in the motor starting with an undesirable velocity and torque dither due to initial rotor position uncertainty. A dithering in velocity or torque is unacceptable in many drive applications, such as, disk drives, electric propulsion, and high performance servos.

Previously disclosed methods for starting a sensorless permanent magnet synchronous motor (PMSM) include, for example, open loop starting strategies with a fixed PWM pattern as disclosed in "A Permanent Magnet Motor Drive Without a Shaft Sensor", R. Wu, G. Slemon, IEEE Transactions on Industry Applications, vol. 27, no. 5, pp. 1005–1011, 1991. The disclosed open loop method yields to a sensorless controller when a suitable back emf has been developed in the method. With such open loop methods, a full torque and a correct torque polarity cannot be guaranteed at startup due to the lack of back emf at startup. Another sensorless PMSM starting strategy uses forced rotor alignment as disclosed in "Brushless DC Motor Control Without Position and Speed Sensors", N. Matsui, M. Shigyo, IEEE Transactions on Industry Applications, vol. 28, no. 1, pp. 120–127, 1992. In this disclosed method a dc current is applied to the stator before startup of the motor. The dc current generates a magnetic flux that acts to align the permanent magnet field with the magnetic field generated by the stator excitation due to the applied dc current. In this method, the initial alignment torque is of a polarity determined by the initial position. Thus, a dithering of velocity and torque is associated with this starting method.

Sensorless starting methods applicable to a salient-rotor PMSM have been suggested wherein the rotor position dependent stator inductance is used to obtain position information. Such methods are disclosed in "A Novel Starting Method of Sensorless Salient-Pole Brushless Motor", N. Matsui, T. Takeshita, IEEE Transactions on Industry Applications, pp 386–392, 1994; "Operation of the Permanent Magnet Synchronous Machine Without a Mechanical Sensor", M. Schroedl, IEE Conf. Publication, pp 51–56, 1991; and "Sensorless Torque Control of Salient-Pole Synchronous Motor at Zero Speed Operation", T. Aihara, A. Toba, T. Yanase, IEEE Applied Power Electronics Conference and Exposition, vol. 2, pp. 715–720, 1997. These disclosed methods of sensorless starting methods applicable to a salient-rotor PMSM's use a direct measurement of stator currents to calculate inductance. Accurate determination of the phase inductance is difficult however due to the small signals provided for measurement, the subtransient effect, and the effects of system noise. In addition, such methods are not particularly effective for determining the rotor position in a round rotor machine.

In another standstill, zero speed rotor position detection method, high frequency test currents are injected into the machine under test at standstill as disclosed in "New Stand-Still Position Detection Strategy for PMSM Drive Without Rotational Transducers", J. S. Kim, S. K. Sul, IEEE Applied Power Electronics Conference, pp 363–369, 1994. This method relies on the presence of a pliable coupling between the rotor and load.

U.S. Pat. No. 5,751,125 discloses a technique wherein the inductance ratio of a delta-wound motor is used to determine the standstill rotor position (electrical angle) of the motor. The disclosed method however yields an ambiguous indication of the rotor angle, since an uncertainty of $\pm\pi$ remains in the result of the method. This technique identifies only a position sector in which the rotor angle lies. U.S. Pat. Nos. 5,841,252 and 5,854,548 both disclose rotor position detection methods that use current waveform risetime measurements to obtain the desired rotor position information. These disclosed techniques are ineffective for round rotor machine applications, and also suffer inaccuracies due to measurement noise.

Other previously proposed strategies have suggested a direct measurement of the inductance through an analysis of a current waveform responsive to the applied voltage. Such direct inductance measurement techniques tend to yield poor results due to subtransient effects, and noise. Furthermore, for machines with very little rotor saliency, the current waveform does not change appreciably, and thus cannot be used effectively to indicate the rotor position.

SUMMARY OF THE INVENTION

The teachings herein comprise a method and apparatus for determining the position of a rotor by applying a voltage across a pair of phases of a motor and using a voltage measurement responsive to the applied voltage and indicative of the distribution of the phase inductances within the phase pair to which a test voltage is applied to determine the rotor position.

The teachings herein are applicable a wide spectrum motors, including round rotor machines since, as will be discussed in greater detail below, the transient reactance generates a temporary change in the per phase inductance.

The teachings herein, while discussed primarily in the context of accurately detecting the rotor position of a three-phase PMSM at zero speed, can be extended to other poly-phase systems. When starting the PMSM, rotor position is required in order to develop full starting torque and to assure a fast, dither-free startup.

BRIEF DESCRIPTION OF THE DRAWINGS

FIG. 4 is a tabular listing for determining the rotor position of a three-phase motor from the measured open circuit voltages across the three phases of a motor in accordance with the teachings herein;

DETAILED DESCRIPTION OF THE INVENTION

Figure 1:
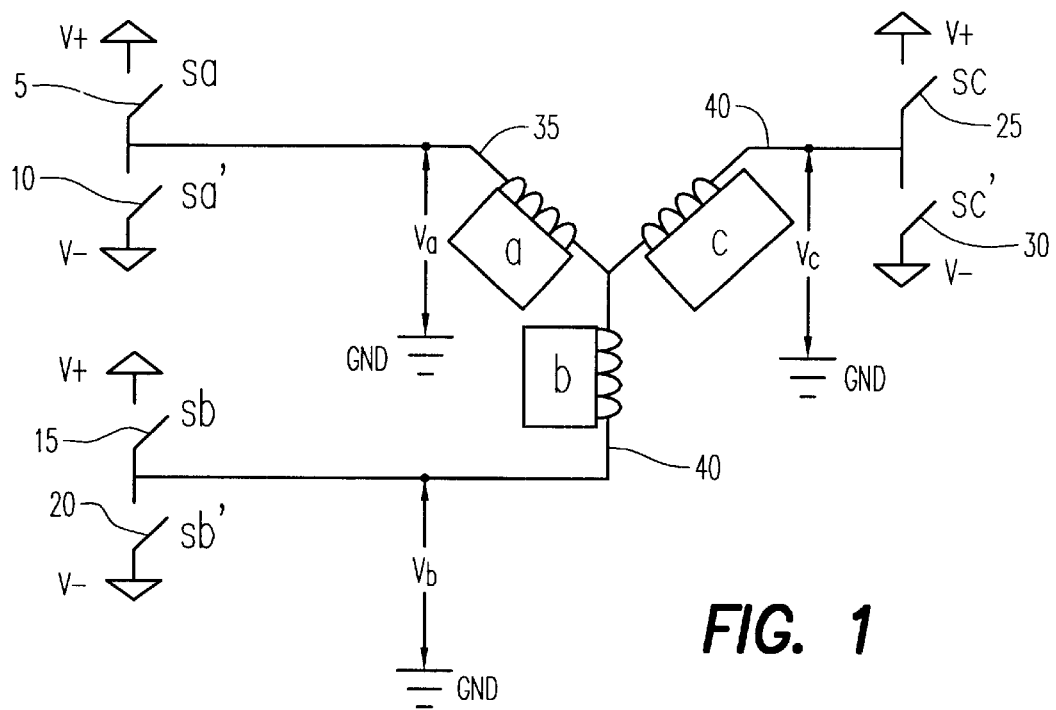
FIG. 1 is a schematic diagram of a PMSM for determining the rotor position at zero speed in accordance with the teachings herein.
Figure 2:
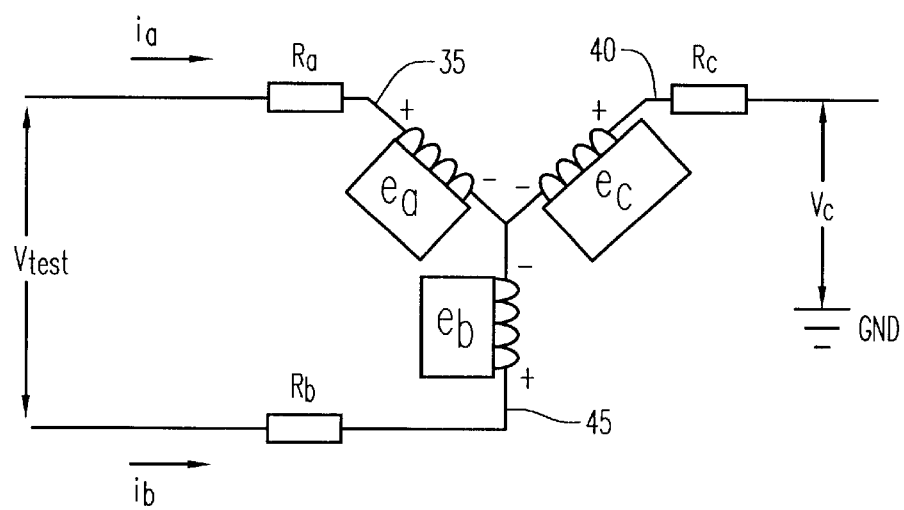
FIG. 2 is a standstill model of a PMSM with a test voltage applied across the phases a and b while phase c is open for measurement in accordance with the teachings herein.
Figure 3:
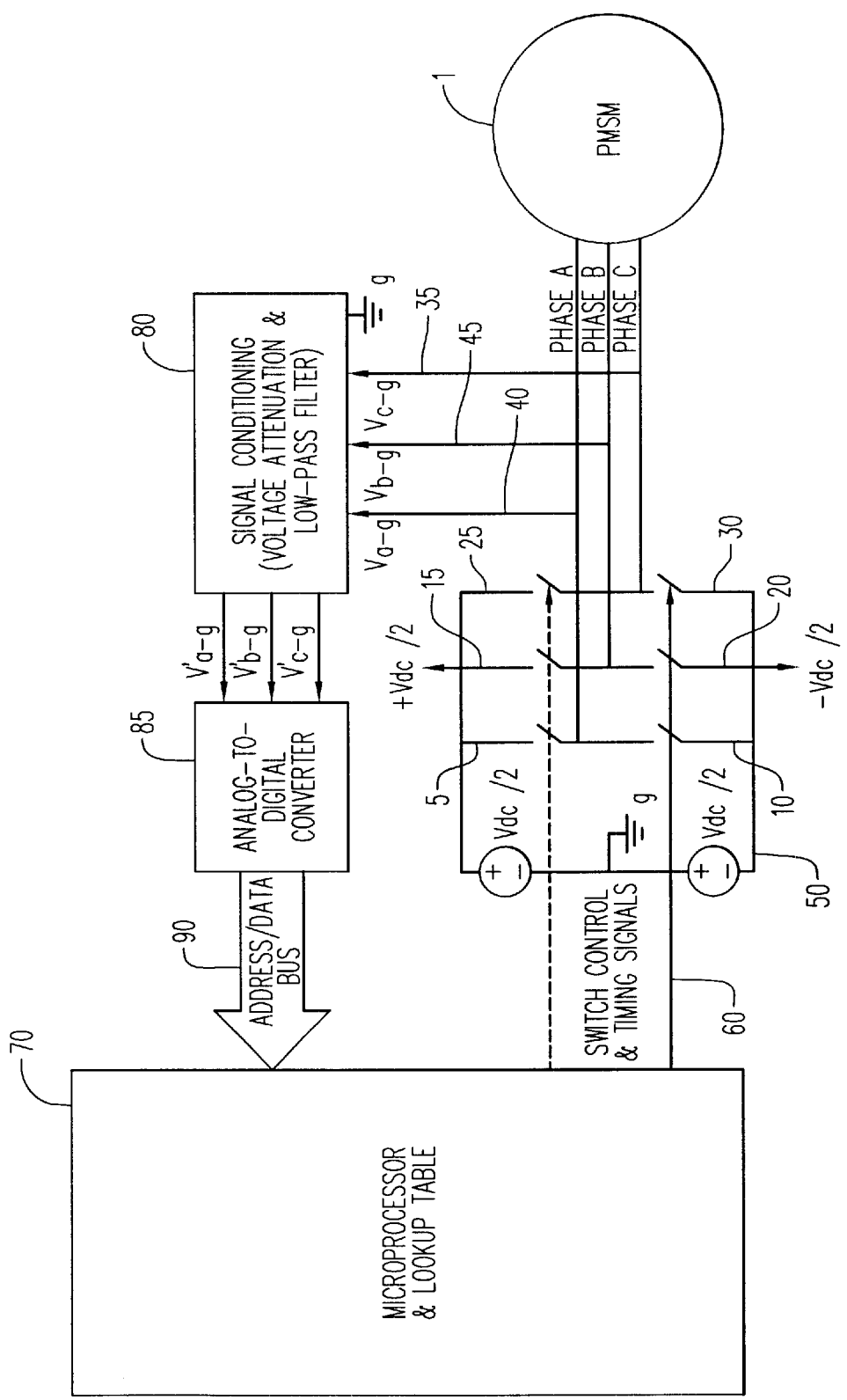
FIG. 3 is a schematic diagram of a system for detecting the rotor position of a PMSM at zero speed in accordance with the teachings herein.

With reference to FIGS. 1, 2, and 3, an apparatus used for determining the rotor position in accordance with the teachings herein will be discussed. FIG. 1 is a simplified schematic diagram of a motor 1. As shown in FIG. 1, each phase of motor 1, that is, phase a 35, phase b 45, and phase c 40 is coupled to both a positive voltage source (V+) and a negative voltage source (V−) through switches. Phase a 35 of the motor 1 is coupled to the positive voltage source (V+) through switch 5 and coupled to the negative voltage source (V−) through switch 10. Phase b 45 of the motor 1 is coupled to the positive voltage source (V+) through switch 15 and coupled to the negative voltage source (V−) through switch 20. Phase c 40 of the motor 1 is coupled to the positive voltage source (V+) through switch 25 and coupled to the negative voltage source (V−) through switch 30.

The switches 5, 10, 15, 20, 25, and 30 are provided so that test voltages of the a positive and a negative polarity can be sequentially applied to motor 1 with the proper timing for determining the rotor position of motor 1 at a standstill zero speed. Although depicted as discrete switches, it would be appreciated by those skilled in the art that other circuitry can be used, such as, integrated circuit means for selectively coupling the phases of motor 1 to the positive and negative voltage sources.

FIG. 2 is a schematic drawing of motor 1 illustrating a test voltage, $V_{test}$, applied across phase a 35 and phase b 45 of motor 1 while phase c is open. FIG. 2 is a representation of FIG. 1 when one of FIG. 1 phase a switches and one of phase b switches are closed, and both of the phase c switches are held open.

FIG. 3 is an exemplary system for implementing the method of the teachings herein for determining the rotor position of a motor at zero speed. FIG. 3 includes a PMSM 1 under test for which the rotor position will be determined. Switching circuitry 50 is coupled to the PMSM 1 under test in the manner described above in discussing FIGS. 1 and 2. The opening and closing of the switches and the timing thereof of the switches of switching circuitry 50 is controlled by microprocessor 70. Microprocessor 70 provides the timing and control signaling necessary to ensure the proper sequential application of test voltages to PMSM 1 under test. Signal conditioning unit 80 receives the measured output from PMSM 1. The measured output signal of the voltage across phase a ($V_{a-g}$) 35, phase b ($V_{b-g}$) 45, and phase C ($V_{c-g}$) 40 are input to signal conditioning unit 60. Signal conditioning unit 60 is not a necessary requirement of the rotor determination system but is provided in FIG. 3 as a means of "pre-conditioning" the measured output from PMSM 1 prior to passing the measured output signals to analog-to-digital converter (ADC) 85. Signal conditioning unit 60 optionally includes voltage attenuation circuitry for reducing the measured voltages 35, 40, 45 of PMSM 1 to a magnitude suitable for input to ADC 85. Signal conditioning unit 60 also optionally includes a low pass filter to reduce the effect of switching transients. ADC 85 provides a digital representation of the measured output signals from PMSM 1 to the microprocessor 70 for determination of the rotor position based on the measured output signals from PMSM 1. Microprocessor 70 in FIG. 3 has lookup tables that contain the relational information concerning the applied test voltage versus the measured output for ascertaining an accurate determination of the rotor position of PMSM 1.

Note that the terminal voltages in FIG. 3 are measured with respect to the midpoint of the DC voltage bus "g" but this is not a requirement for the circuit.

In accordance with the teachings herein, an open circuit voltage of a motor are measured while sequentially exciting two of the three possible phase pairs in a three-phase motor to provide the orientation of the rotor direct axis.

Accordingly, a method for detecting the rotor position of a three-phase PMSM at standstill (i.e., zero speed) is implemented by applying a test voltage pulse across any two of the motor terminals of a three-phase motor while a response to the applied voltage is measured at the open phase of the motor. The test voltage is then applied across a different pair of motor phases and a measurement is taken across a second open phase of the motor different than the first measured open phase. The polarity and timing of the application of the test voltages is selectively controlled to ensure the proper timing and opening and closing of the switches sa 5, sa' 10, sb 15, sb' 20, sc 25, and sc' 30 as shown in FIG. 1.

The process of applying the test voltage across phase pairs of a motor and measuring the responsive voltage signal at the open phase of the motor for determining the rotor position of the motor will now be discussed with reference to FIGS. 1, 2, and 3. In particular, the a, b phase pair and then the b, c phase pair of a motor for which the rotor position is to be determined will be described.

First, in step 1, the switches sa 5 and sb' 20 are closed and the other switches are left in the open state. This applies a positive voltage across phases a 35 and b 45. This state of the switches is maintained for a time sufficient for the phase current to approach the rated current of the machine. This time period is dependent on the electrical time constant of the machine under test.

Next, in a step 2, switches sa' 10 and sb 15 are closed very soon after the opening of switches sa 5 and sb' 20 in order to avoid shoot-through currents. This switch configuration applies a negative voltage across windings a 35 and b 45. The voltage in the open phase c 40, Vc, is measured shortly after closing switches sa' 10 and sb 15. This state of the switches is maintained for a time sufficient for the phase current to approach the rated current of the machine. The direction of the current in this switch configuration is opposite to the current resulting from step 1.

In step 3 the switches sa 5 and sb' 20 are closed very soon after opening all other switches. This again applies a positive voltage across phase windings a 35 and b 45 The voltage in the open phase c 40, Vc, is measured shortly after closing switches sa 5 and sb' 20.

In a next step 4, the switches sb 15 and sc' 30 are closed and all other switches are left in the open state. This applies a positive voltage across phases b 45 and c 40. This state of the switches is maintained for a time sufficient for the phase current to approach the rated current of the machine, and is dependent on the electrical time constant of the machine under test.

In step 5, the switches sb' 20 and sc 25 are closed very shortly after the opening of switches sb 15 and sc' 30 to avoid shoot-through currents. This applies a negative voltage across windings b 45 and c 40. The voltage in the open phase a 35, Va, is measured shortly after closing switches sb' 20 and sc 25. This configuration of the switches is maintained for a time sufficient for the phase current to approach the rated current of the machine. The direction of the current in this step is the opposite of the current resulting in step 4.

In step 6, switches sb 15 and sc' 30 are closed very shortly after opening all other switches. This again applies a positive voltage across phases b 45 and c 40. The voltage in the open phase a 35, Va, is measured shortly after closing switches sb 15 and sc' 30.

The above-described method can be used to determine the position of a motor rotor. The basis for using the open phase to obtain the standstill rotor position is that the reactance of each motor phase is a function of twice the rotor angle (θ) as will be shown below. Furthermore, an asymmetry introduced by the permanent magnet flux introduces a rotor position-dependent reactance that is a function of one times the rotor angle (θ).

Note that the degree of the winding reactance dependence on the rotor position is determined by the construction of the PMSM.

The process of determining the orientation of the rotor from the measured open circuit test voltages is summarized in the table provided in FIG. 4. In FIG. 4, rotor orientation is obtained from the sign of three measured open circuit voltages, where $v_{a+}$, for example, represents the measured open circuit voltage of phase a for a positive voltage test pulse $v_{test}$. Note FIG. 4 describes the response of a salient rotor PMSM, but different motor construction techniques may generate different lookup tables. The relative magnitudes and signs of the measured voltages allows for the unambiguous determination of the rotor position in accordance with the teachings herein. Greater resolution estimates can be obtained by comparing the relative magnitudes of the measured open circuit voltages, as shown in the third column of the table provided in FIG. 4. Although the table demonstrates the decoding of three measured open circuit voltages to obtain rotor orientation, rotor orientation can be accurately determined by measuring the open circuit voltages of just two phase pairs, such as phase pair ab and phase pair bc as previously explained in the illustrative example above.

In general however, the PMSM 1 per phase inductance terms may be expressed as, $$L_{aa} = L_l + L_A - L_B \cos(2\theta) \tag{1a}$$

$$L_{bb} = L_l + L_A - L_B \cos(2\theta + 2\pi/3) \tag{1b}$$

$$L_{cc} = L_l + L_A - L_B \cos(2\theta - 2\pi/3) \tag{1C}$$

$$L_{ab} = L_{ba} = -\frac{1}{2}L_A - L_B \cos(2\theta - 2\pi/3) \tag{1d}$$

$$L_{ac} = L_{ca} = -\frac{1}{2}L_A - L_B \cos(2\theta - 2\pi/3) \tag{1e}$$

$$L_{bc} = L_{cb} = -\frac{1}{2}L_A - L_B \cos(2\theta - 2\pi/3) \tag{1f}$$

where $L_l$ represents the leakage inductance, $L_A$ represents the average inductance, and $L_B$ represents rotor position dependent inductance terms. $L_B$ may be positive or negative depending on the construction of the PMSM.

With reference to FIG. 2, the test voltage is applied across phases a and b, and phase c is left open. Therefore, with $i_a = -i_b$, $i_c = 0$, and angular velocity of zero ($\theta = 0$ at standstill), the terminal voltage equation may be written as $$V_{test}(t) - e_a(t) + e_b(t) - i_a(t)[R_a + R_b] = 0 \tag{2}$$

where the winding electromotive forces in phases a 35, b 45, and c 40 ($e_{a,b,c}$) are defined by equation 3(a-c) as follows, $$e_a(t) = \frac{d\lambda_a}{dt} = L_{aa}\frac{di_a}{dt} - L_{ab}\frac{di_a}{dt} \tag{3a}$$

$$e_b(t) = \frac{d\lambda_b}{dt} = L_{ab}\frac{di_a}{dt} - L_{bb}\frac{di_a}{dt} \tag{3b}$$

$$e_c(t) = \frac{d\lambda_c}{dt} = L_{ac}\frac{di_a}{dt} - L_{bc}\frac{di_a}{dt} \tag{3c}$$

The terms $\lambda_x$, $L_{xx}$ and $L_{xy}$ in the above equations, 3(a-c) represent the flux linking phase x, the self inductance of phase x, and the mutual inductance between phase x and phase y. The symbols x and y may have the value of a, b, or c to indicate which phase the terms are referencing with the restriction that x not equal y (i.e., x≠y).

Mathematically combining the previous two equations, that is equations (2) and (3) yields, $$V_{test}(t) = (L_{aa} + L_{bb} - 2L_{ab})\frac{di_a}{dt} + (R_a + R_b)i_a \tag{4}$$

Solving the above equation for the resulting current value yields, $$i_a(t) = \frac{V_{test}(t)}{(R_a + R_b)}\left[1 - e^{-\left(\frac{R_a + R_b}{L_{aa} + L_{bb} - 2L_{ab}}\right)t}\right] + i_0 e^{-\left(\frac{R_a + R_b}{L_{aa} + L_{bb} - 2L_{ab}}\right)t} \tag{5}$$

where $i_0$ is the initial current at the time of the test voltage transition.

Using the above obtained results, it can be shown that the voltage measured at the open phase (phase c in the present example of FIG. 2) in response to the test voltage applied across phases a 35 and b 45 will be given by equation (6) as follows, $$v_c(t) = i_a(t)R_b - e_b + e_c = \left[\frac{[(L_{bb} - L_{ab}) + (L_{ac} - L_{bc})][V_{test} - i_0(R_a + R_b)]}{L_{aa} + L_{bb} - 2L_{ab}}\right]e^{-\left(\frac{R_a + R_b}{L_{aa} + L_{bb} - 2L_{ab}}\right)t} +$$

$$\frac{R_b}{R_a + R_b}V_{test}\left[1 - e^{-\left(\frac{R_a + R_b}{L_{aa} + L_{bb} - 2L_{ab}}\right)t}\right] + i_0 R_b e^{-\left(\frac{R_a + R_b}{L_{aa} + L_{bb} - 2L_{ab}}\right)t}$$

$$= \left[\frac{1/2L_A - 2L_B\cos(2\theta - 2\pi/3)}{2L_l + 3[L_A + L_B\cos(2\theta + 2\pi/3)]}[V_{test} - i_0(R_a + R_b)]\right]e^{-\left(\frac{R_a + R_b}{L_{aa} + L_{bb} - 2L_{ab}}\right)t} +$$

$$\frac{R_b}{R_a + R_b}V_{test}\left[1 - e^{-\left(\frac{R_a + R_b}{L_{aa} + L_{bb} - 2L_{ab}}\right)t}\right] + i_0 R_b e^{-\left(\frac{R_a + R_b}{L_{aa} + L_{bb} - 2L_{ab}}\right)t}$$

From the previous equation (6), it is seen that the amplitude of the voltage measured on the open phase c has amplitude that is a function of twice the rotor angle (i.e., 2θ). This relationship means that for every electrical cycle of rotation (i.e., rotor rotation), the measured voltage goes through two cycles.

Figure 5:
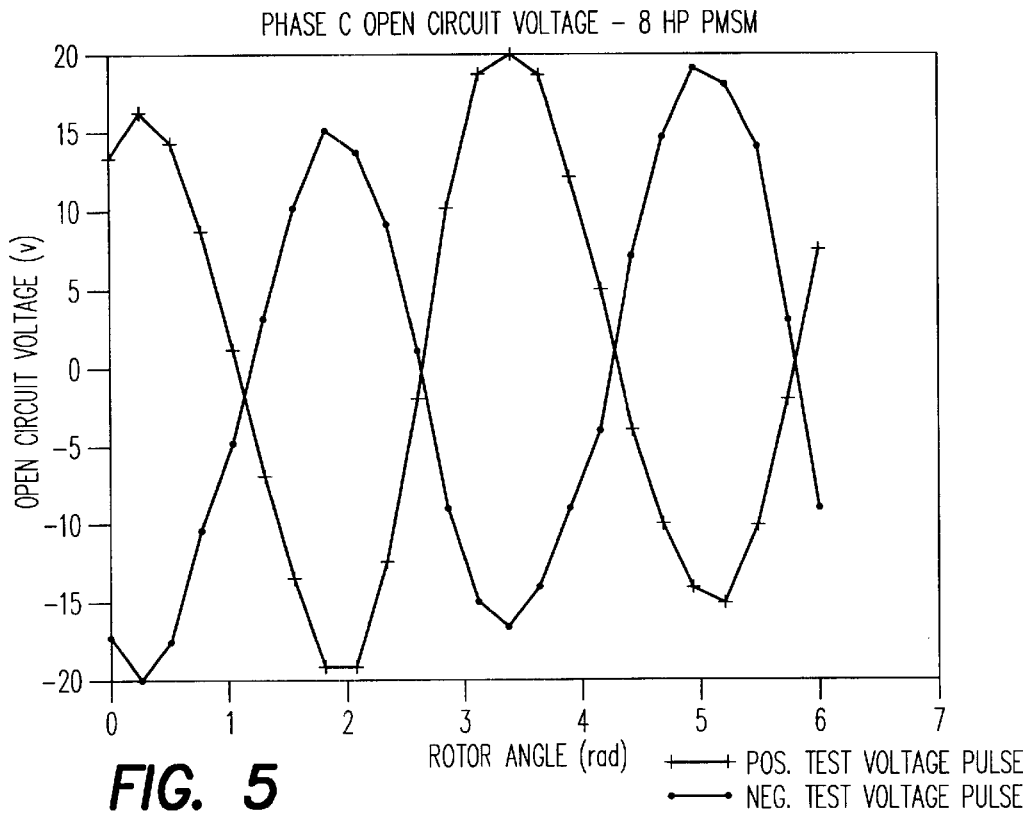
FIG. 5 is a depiction of the measured voltage on the open phase c with test voltage applied across phases a and b.
Figure 6:
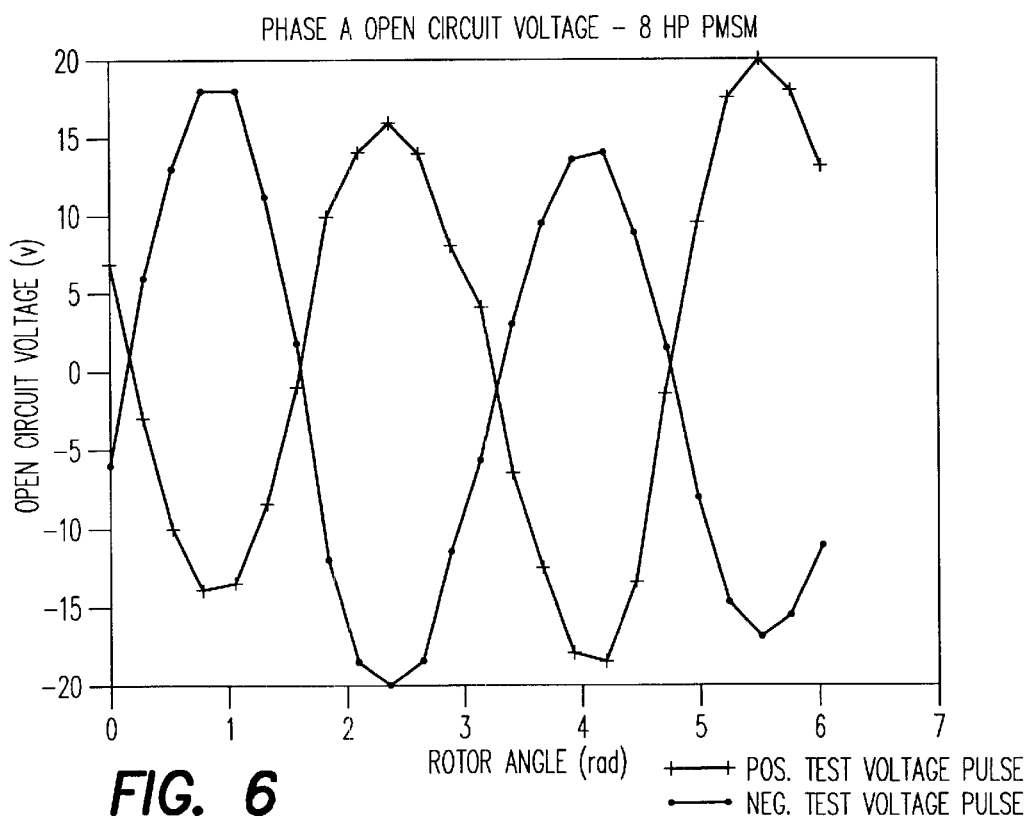
FIG. 6 is a depiction of the measured voltage on open phase a with test voltage applied across phases b and c.
Figure 7:
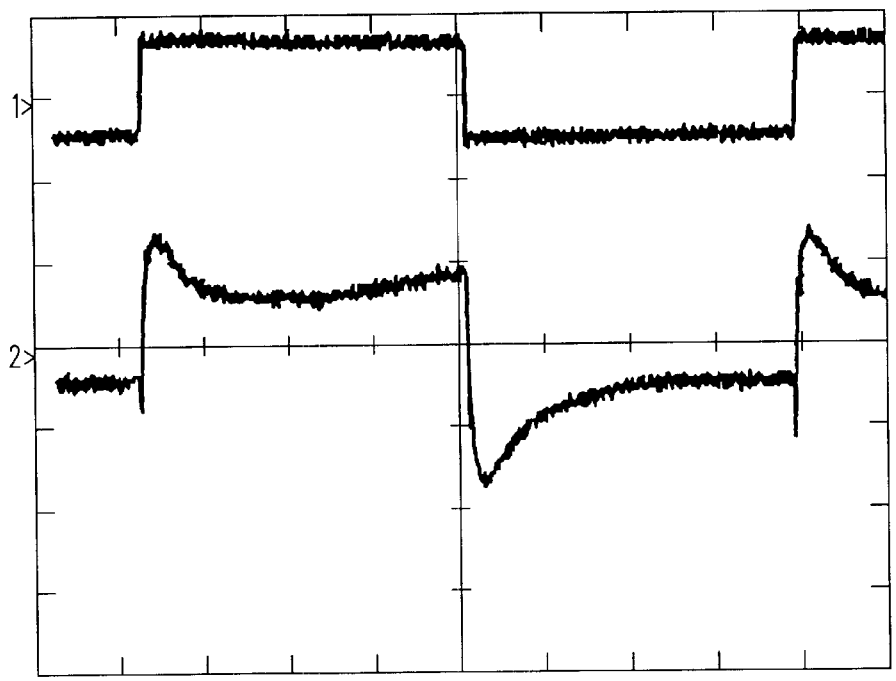
FIG. 7 is a depiction of the measured phase a, b excitation voltage (upper) and the response measured on phase c (lower) at 0 degrees for FIG. 5.
Figure 8:
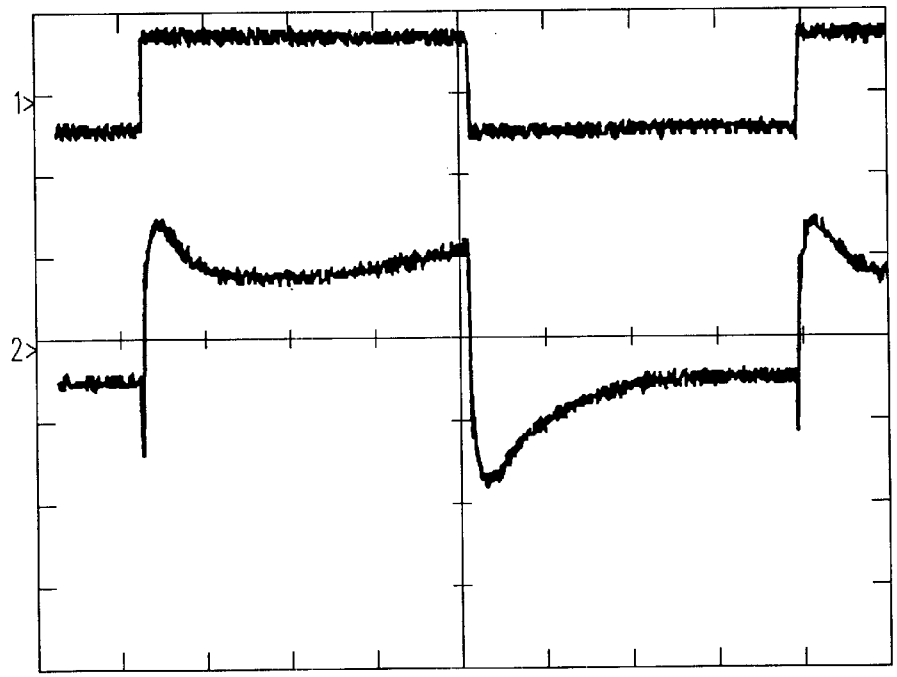
FIG. 8 is a depiction of the measured phase a, b excitation voltage (upper) and the response measured on phase c (lower) at 30 degrees for FIG. 5.
Figure 9:
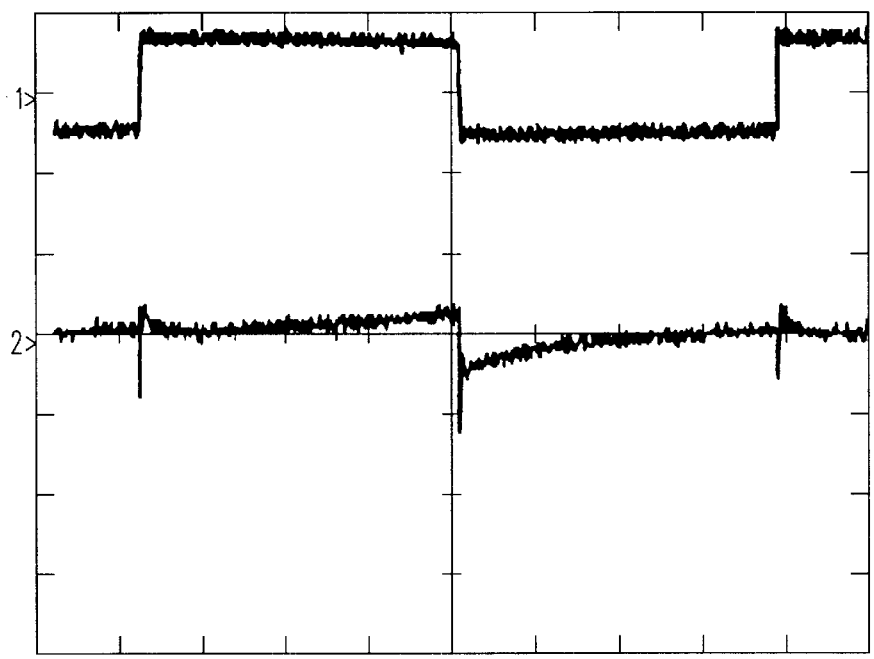
FIG. 9 is a depiction of the measured phase a, b excitation voltage (upper) and the response measured on phase c (lower) at 60 degrees for FIG. 5.
Figure 10:
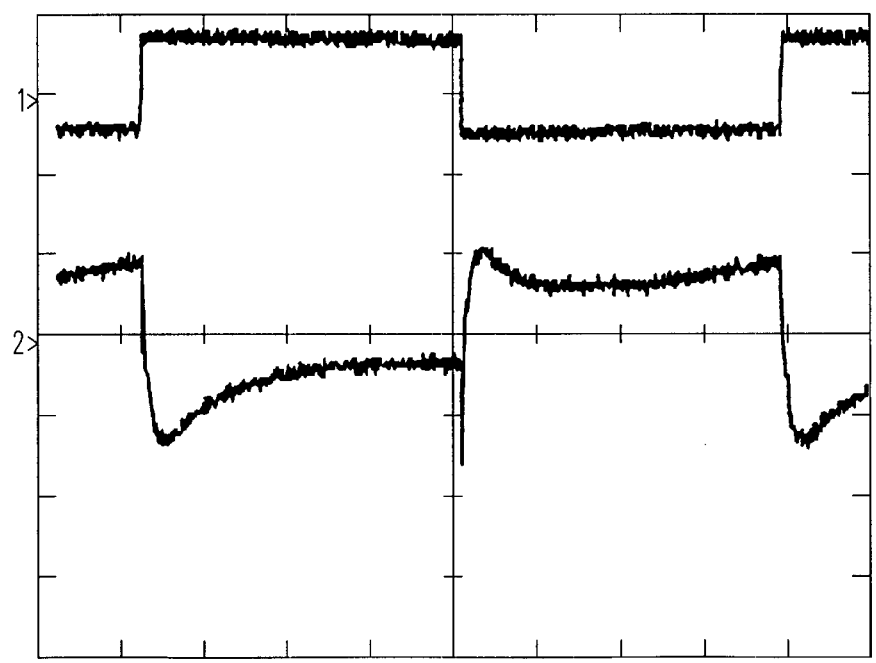
FIG. 10 is a depiction of the measured phase a, b excitation voltage (upper) and the response measured on phase c (lower) at 90 degrees for FIG. 5.
Figure 11:
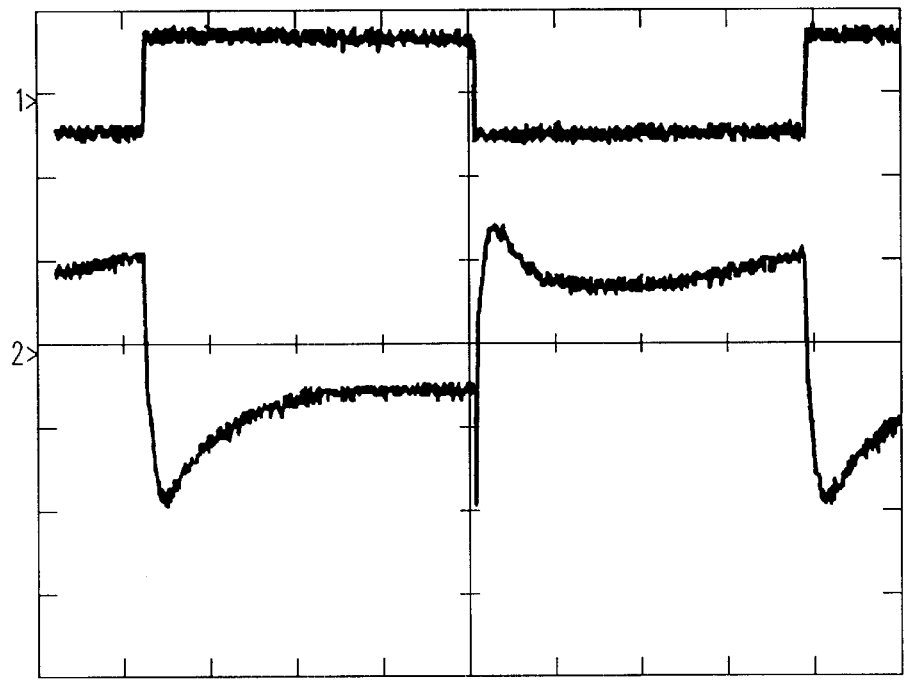
FIG. 11 is a depiction of the measured phase a, b excitation voltage (upper) and the response measured on phase c (lower) at 120 degrees for FIG. 5.
Figure 12:
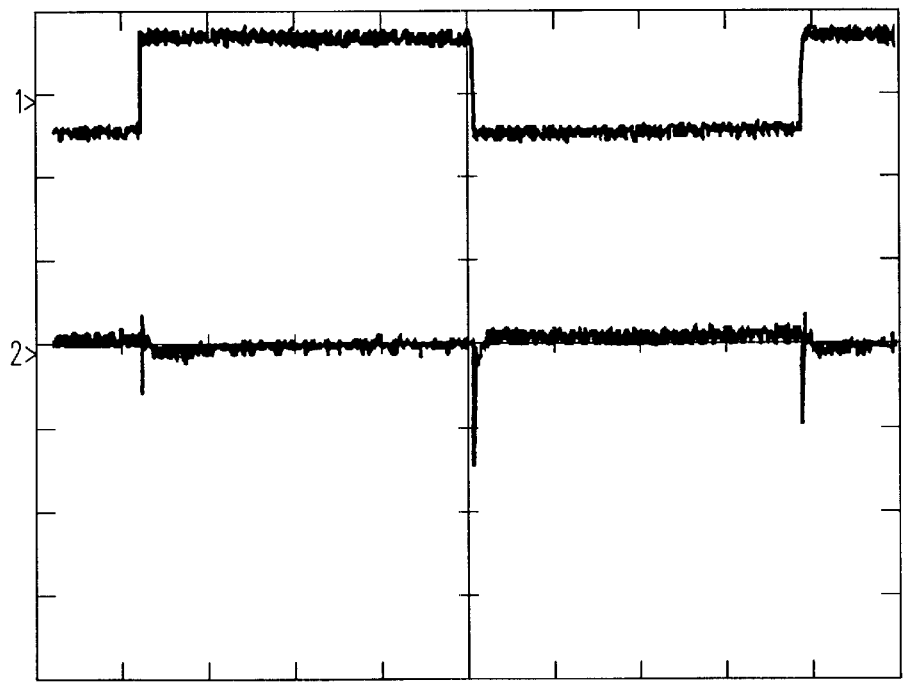
FIG. 12 is a depiction of the measured phase a, b excitation voltage (upper) and the response measured on phase c (lower) at 150 degrees for FIG. 5.
Figure 13:
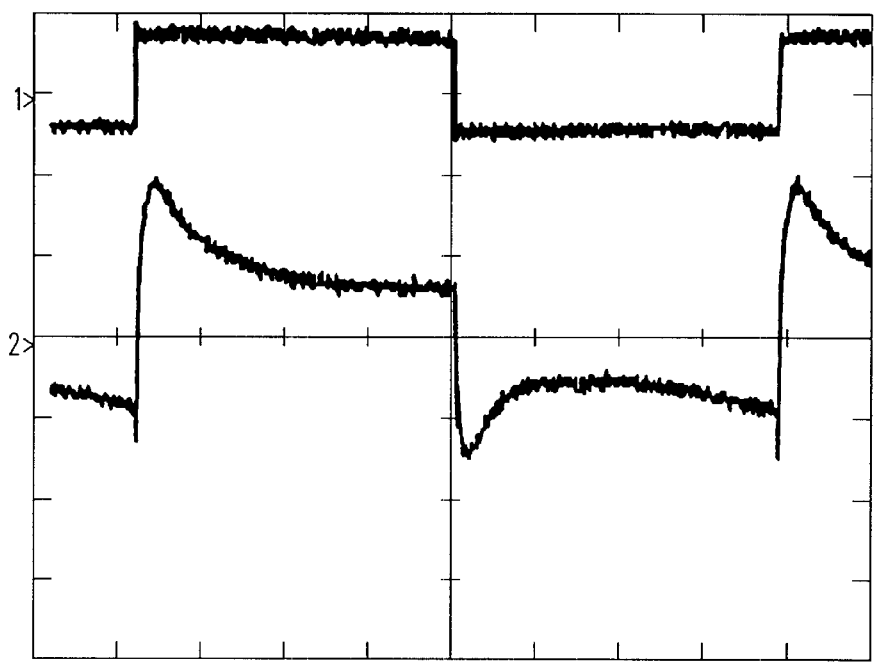
FIG. 13 is a depiction of the measured phase a, b excitation voltage (upper) and the response measured on phase c (lower) at 180 degrees for FIG. 5.
Figure 14:
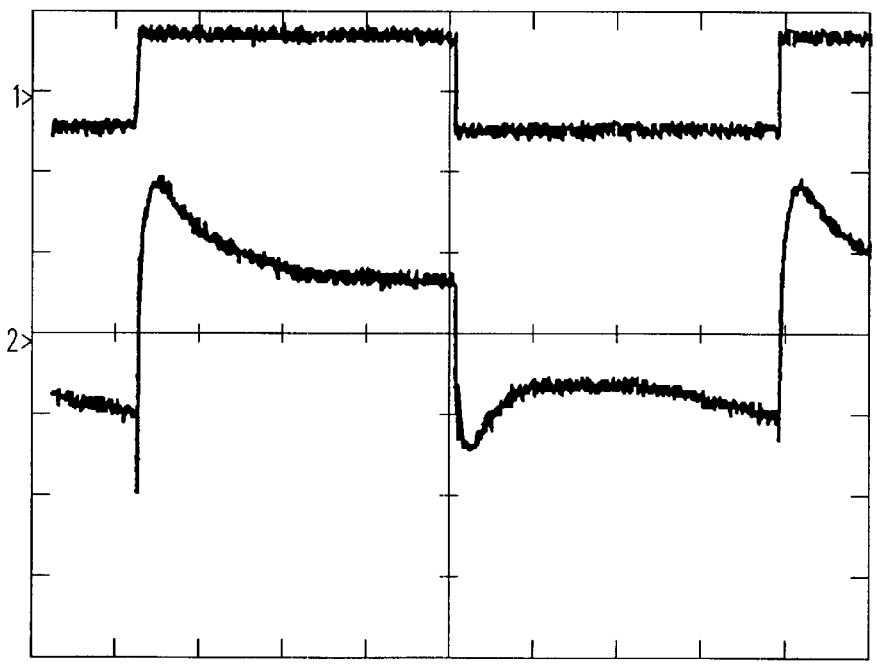
FIG. 14 s a depiction of the measured phase a, b excitation voltage (upper) and the response measured on phase c (lower) at 210 degrees for FIG. 5.
Figure 15:
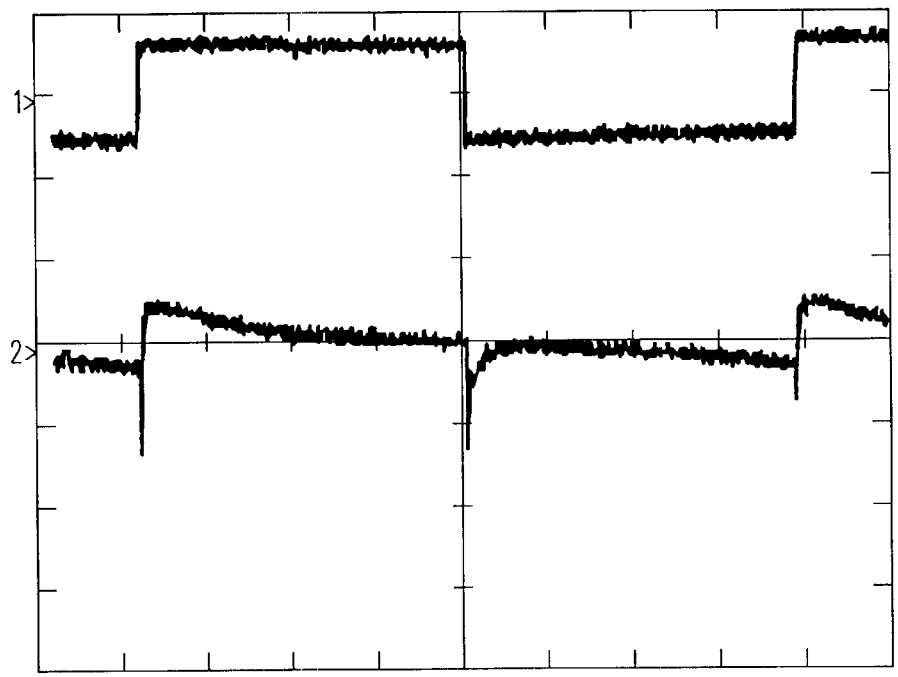
FIG. 15 is a depiction of the measured phase a, b excitation voltage (upper) and the response measured on phase c (lower) at 240 degrees for FIG. 5.
Figure 16:
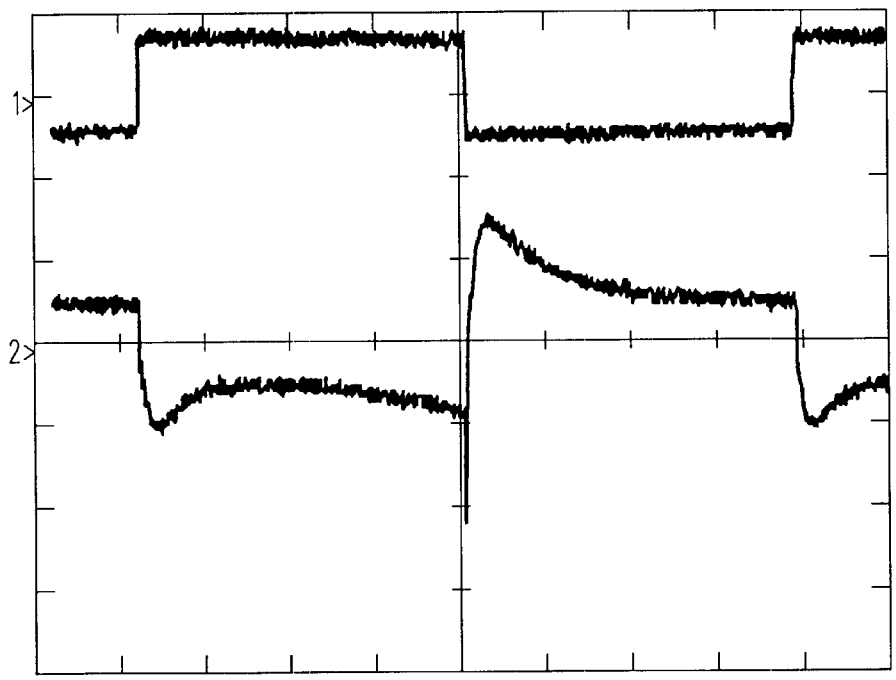
FIG. 16 is a depiction of the measured phase a, b excitation voltage (upper) and the response measured on phase c (lower) at 270 degrees for FIG. 5.
Figure 17:
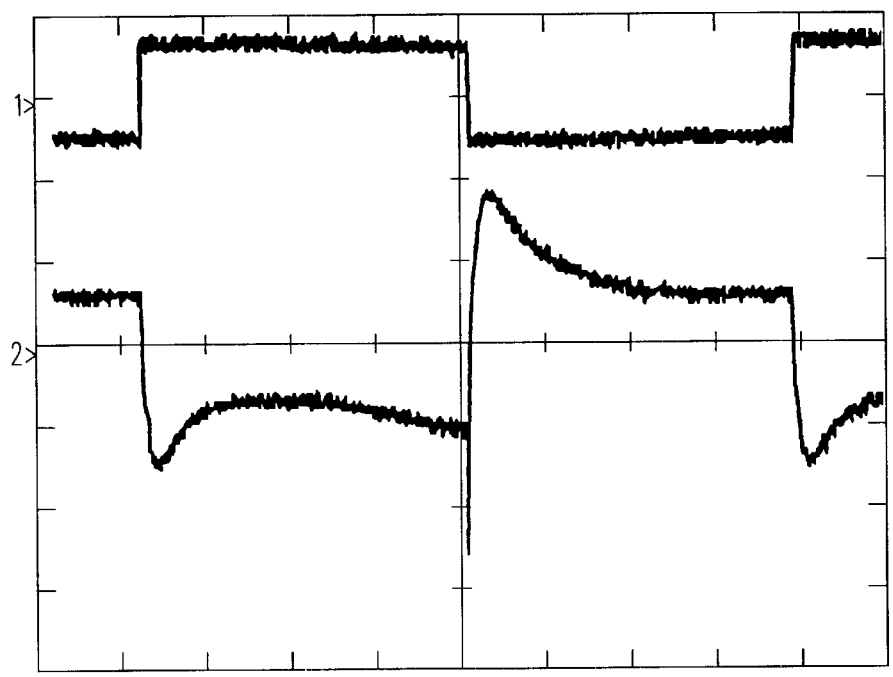
FIG. 17 is a depiction of the measured phase a, b excitation voltage (upper) and the response measured on phase c (lower) at 300 degrees for FIG. 5.
Figure 18:
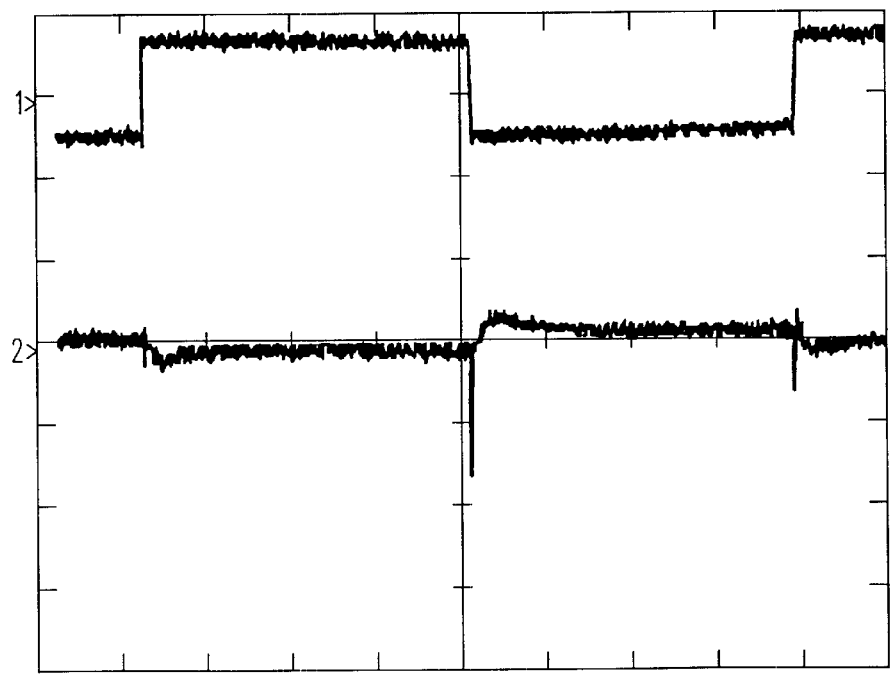
FIG. 18 is a depiction of the measured phase a, b excitation voltage (upper) and the response measured on phase c (lower) at 330 degrees for FIG. 5.
Figure 19:
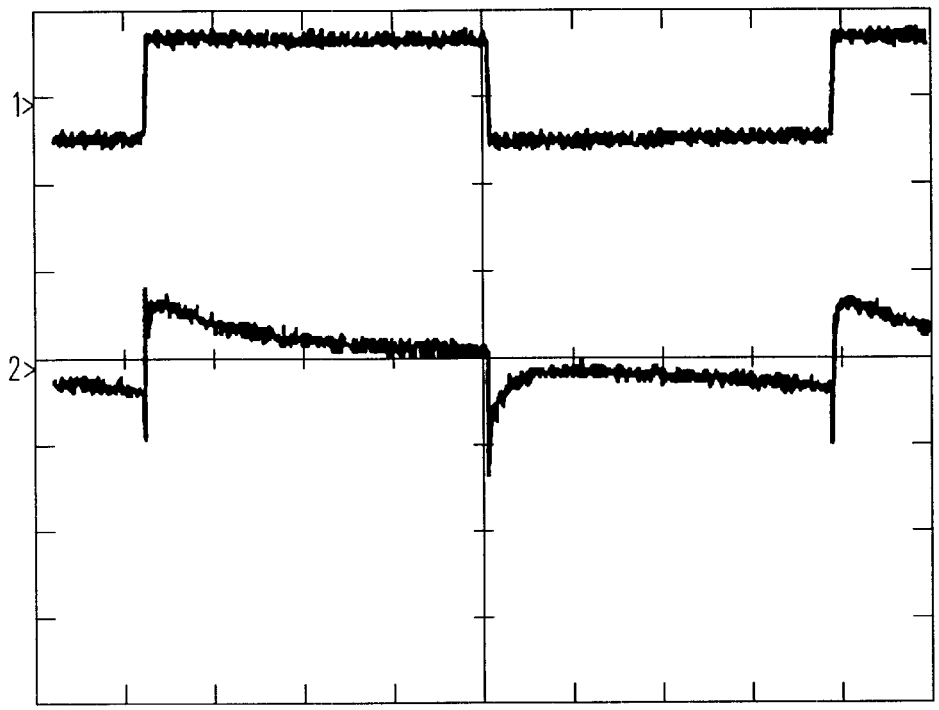
FIG. 19 is a depiction of the measured phase b, c excitation voltage (upper) and the response measured on phase a (lower) at 0 degrees for FIG. 6.
Figure 20:
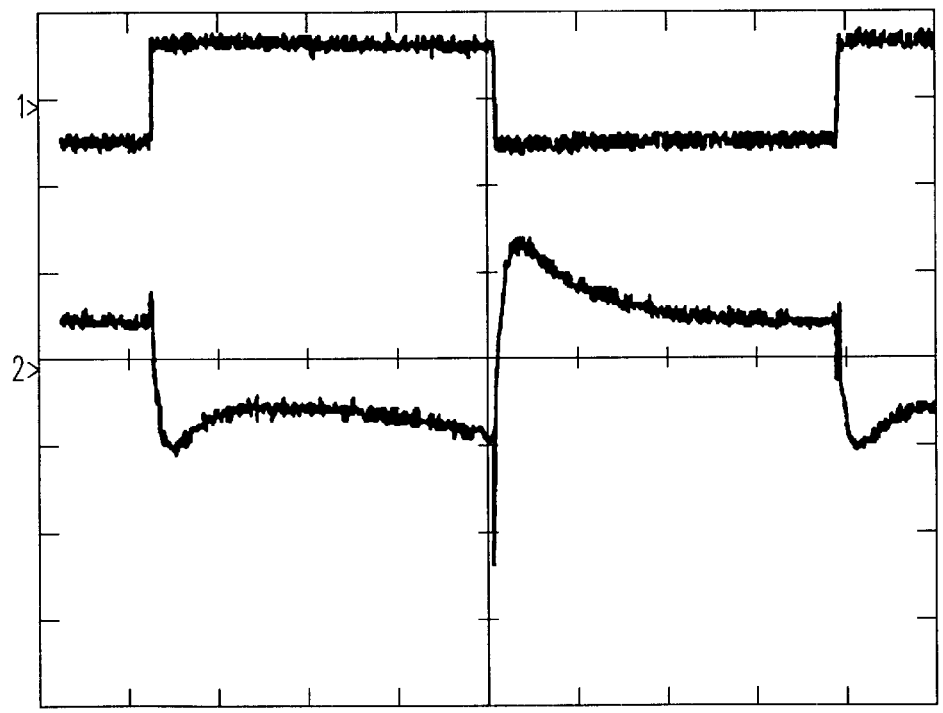
FIG. 20 is a depiction of the measured phase b, c excitation voltage (upper) and the response measured on phase a (lower) at 30 degrees for FIG. 6.
Figure 21:
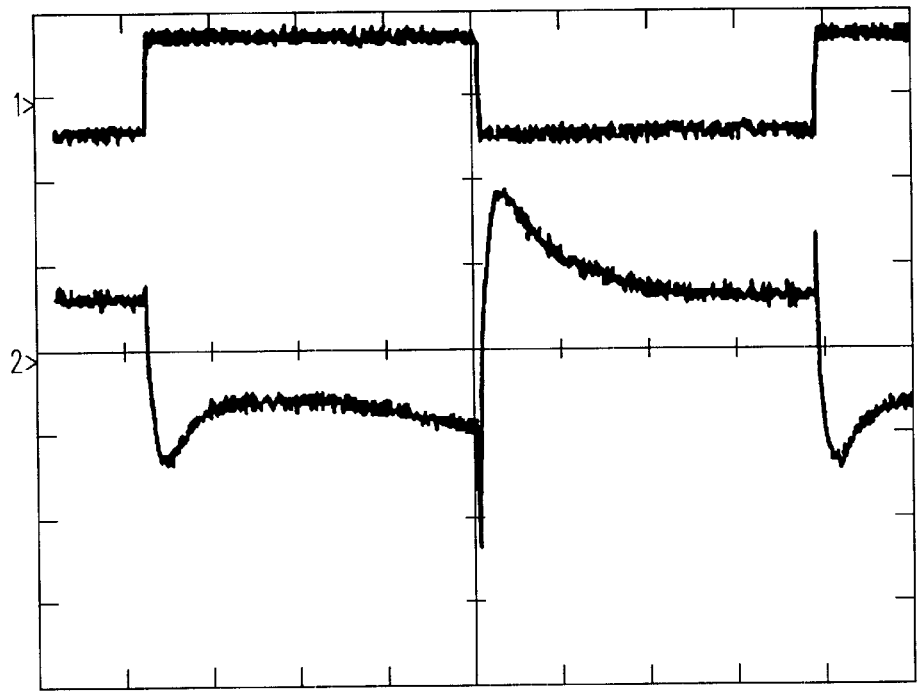
FIG. 21 is a depiction of the measured phase b, c excitation voltage (upper) and the response measured on phase a (lower) at 60 degrees for FIG. 6.
Figure 22:
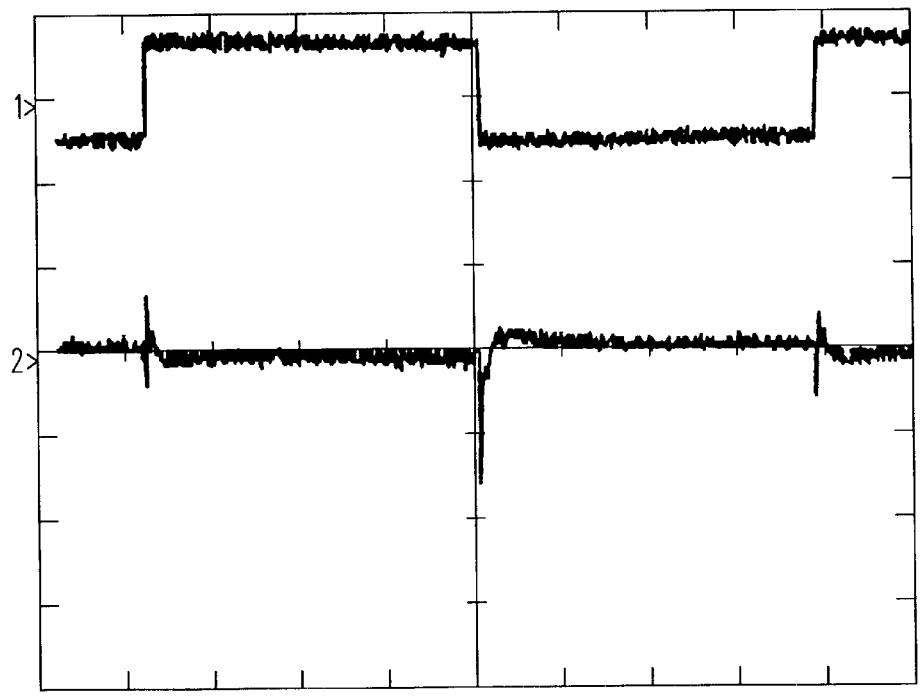
FIG. 22 is a depiction of the measured phase b, c excitation voltage (upper) and the response measured on phase a (lower) at 90 degrees for FIG. 6.
Figure 23:
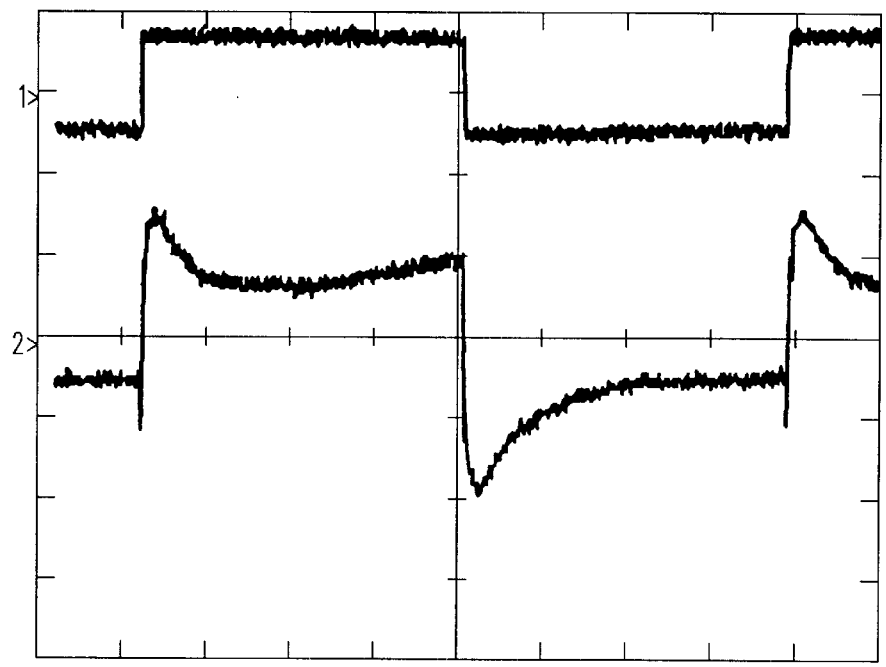
FIG. 23 is a depiction of the measured phase b, c excitation voltage (upper) and the response measured on phase a (lower) at 120 degrees for FIG. 6.
Figure 24:
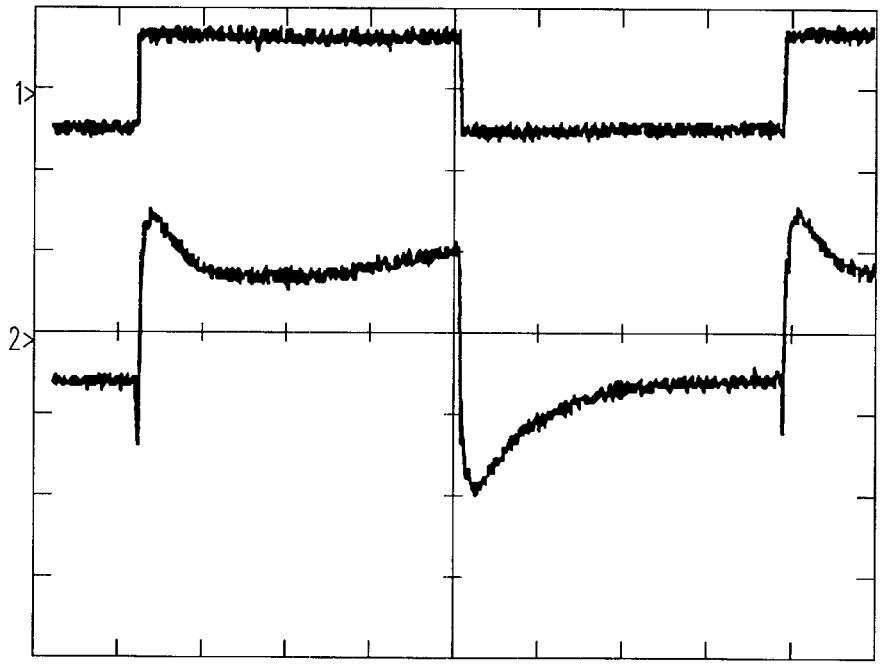
FIG. 24 is a depiction of the measured phase b, c excitation voltage (upper) and the response measured on phase a (lower) at 150 degrees for FIG. 6.
Figure 25:
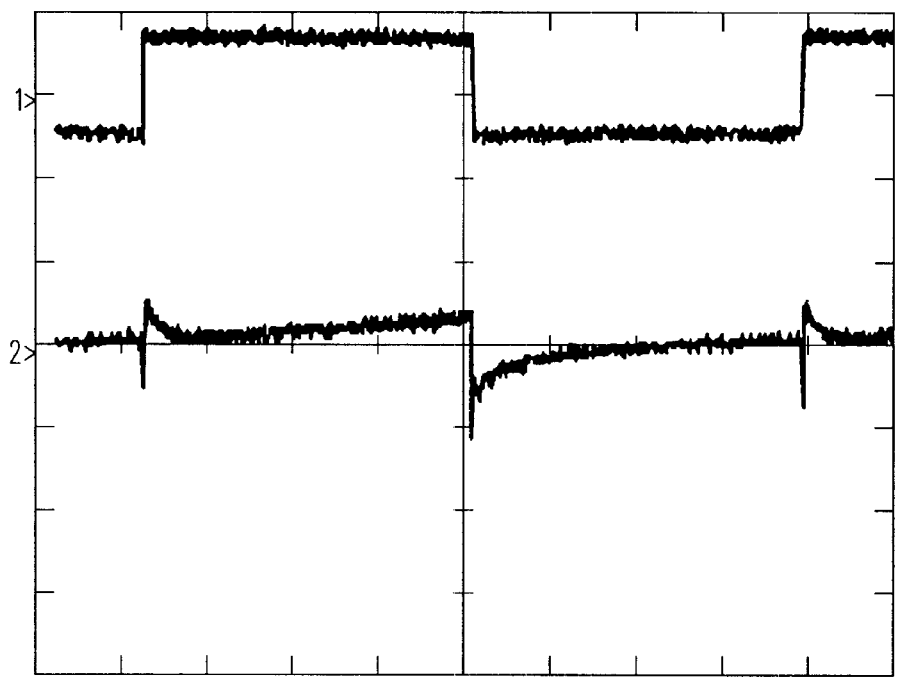
FIG. 25 is a depiction of the measured phase b, c excitation voltage (upper) and the response measured on phase a (lower) at 180 degrees for FIG. 6.
Figure 26:
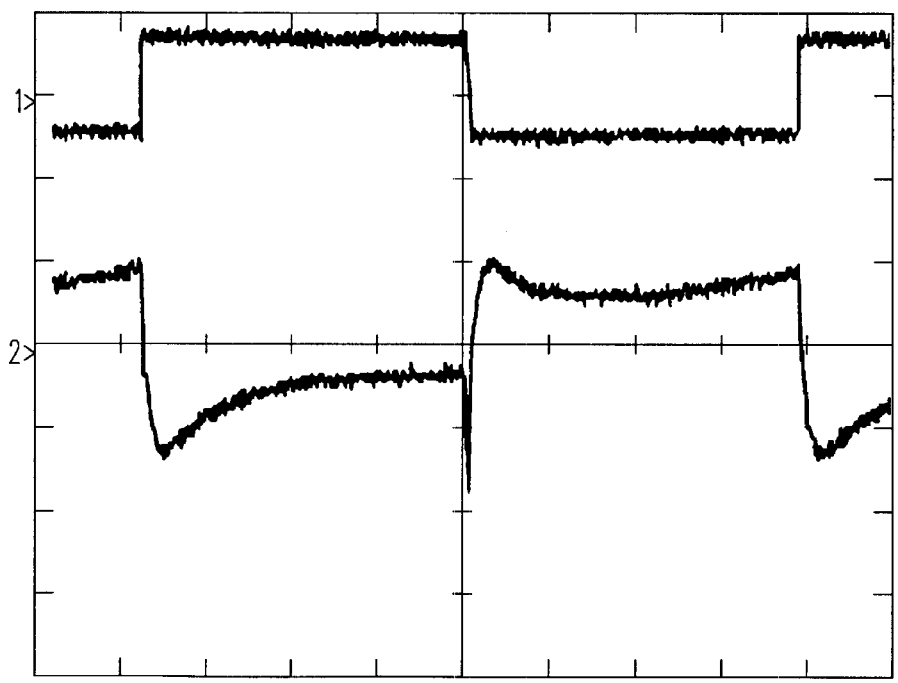
FIG. 26 is a depiction of the measured phase b, c excitation voltage (upper) and the response measured on phase a (lower) at 210 degrees for FIG. 6.
Figure 27:
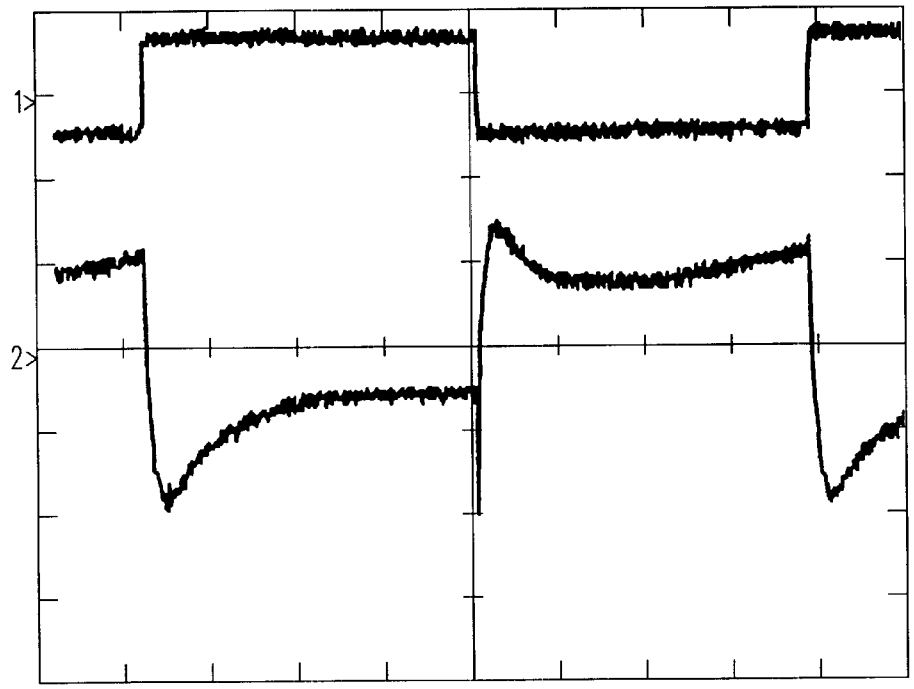
FIG. 27 is a depiction of the measured phase b, c excitation voltage (upper) and the response measured on phase a (lower) at 240 degrees for FIG. 6.
Figure 28:
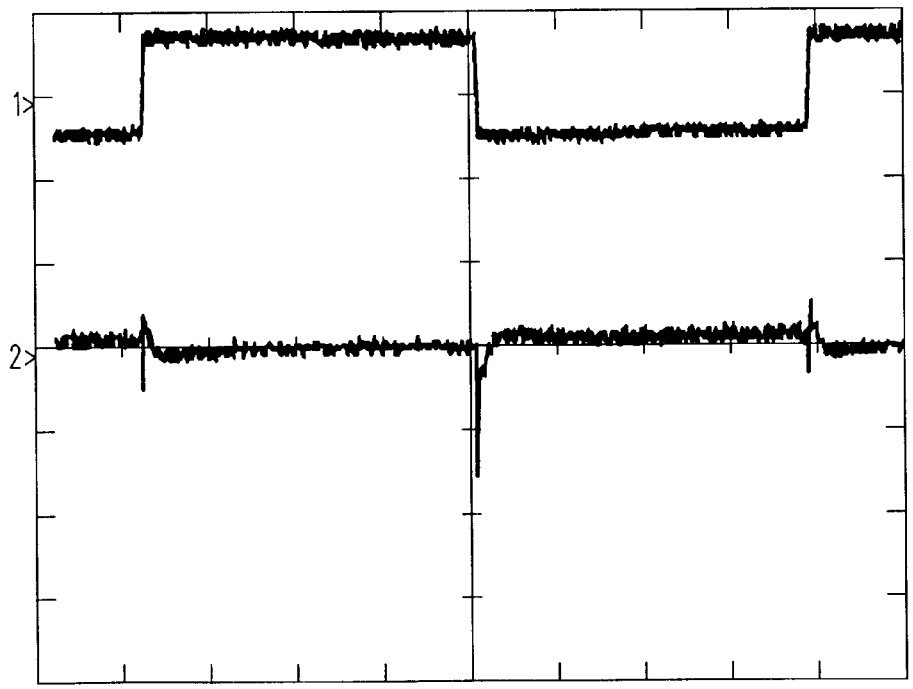
FIG. 28 is a depiction of the measured phase b, c excitation voltage (upper) and the response measured on phase a (lower) at 270 degrees for FIG. 6.
Figure 29:
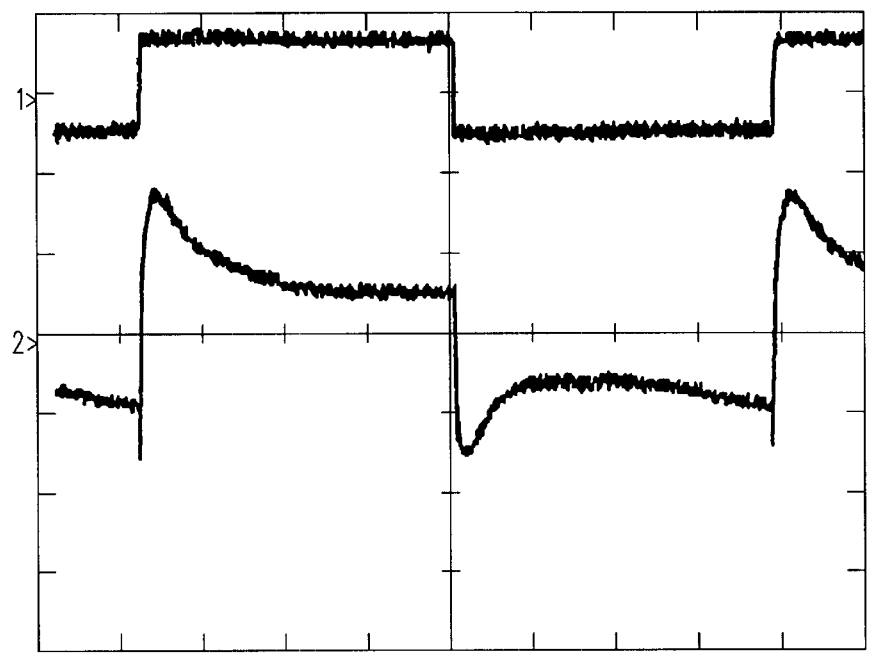
FIG. 29 is a depiction of the measured phase b, c excitation voltage (upper) and the response measured on phase a (lower) at 300 degrees for FIG. 6.
Figure 30:
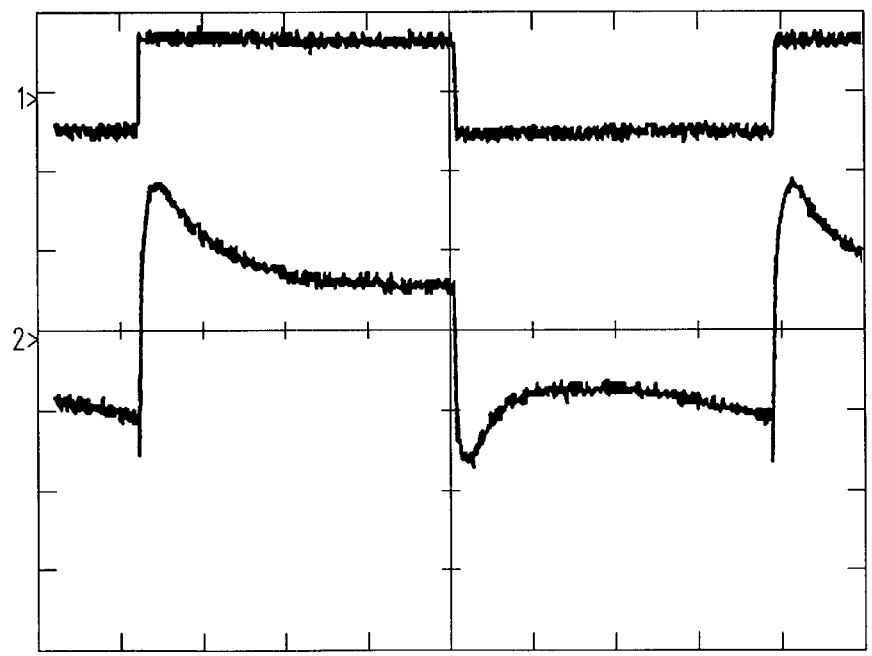
FIG. 30 is a depiction of the measured phase b, c excitation voltage (upper) and the response measured on phase a (lower) at 330 degrees for FIG. 6.

A clearer understanding of the rotor position and open phase voltage relationship can be had by referencing FIGS. 5 and 6. FIGS. 5 and 6 illustrate the measured voltage in the open phase winding (c) and (a) versus rotor position for test voltage pulses applied to the ab and bc phase pair, respectively. In these figures, the open phase voltage is measured just after switching the test voltage and prior to the exponential decay of this voltage as indicated in equation (6) above, when the voltage is at its maximum. In each figure, the measured open circuit voltage is shown for both positive and negative test voltage transitions, which correspond to a negative and positive phase a current, respectively.

The actual test voltage and measured open phase voltage waveforms used to generate FIG. 5 are shown in FIGS.

7–18. The actual test voltage and measured open phase voltage waveforms used to generate FIG. 6 are shown in FIGS. 19–30. The FIGS. 7–18 and 19–30 are taken at various angles (e.g., 0, 30, 60, 90, . . . ).

It is seen in FIGS. 5 and 6 that the measured open phase voltage varies with twice the rotor angle(2θ). Given the measured open phase voltage for both positive and negative phase currents with the test voltage applied to two different phase pairs, the rotor angle of the motor can accurately be determined without ambiguity.

The measured open phase voltages for a test voltage pulse applied to a single phase pair yields four candidate rotor angles. By performing the same measurements with the test voltage pulse applied to a different phase pair, two of the candidate rotor angles can be eliminated. The relative amplitude of the measured open phase voltages is used to choose the proper rotor angle from the two remaining candidate angles.

The process of accurately determining the rotor angle is summarized in FIG. 4. By referencing FIG. 4 after the application of test voltages and the measurement of the open phase voltage, the rotor position can be accurately determined. A lookup table containing the information of table 4 can be stored in a memory accessible to the microprocessor 70 depicted in FIG. 4 in an embodiment of a system for determining the rotor position of a motor.

Figure 31:
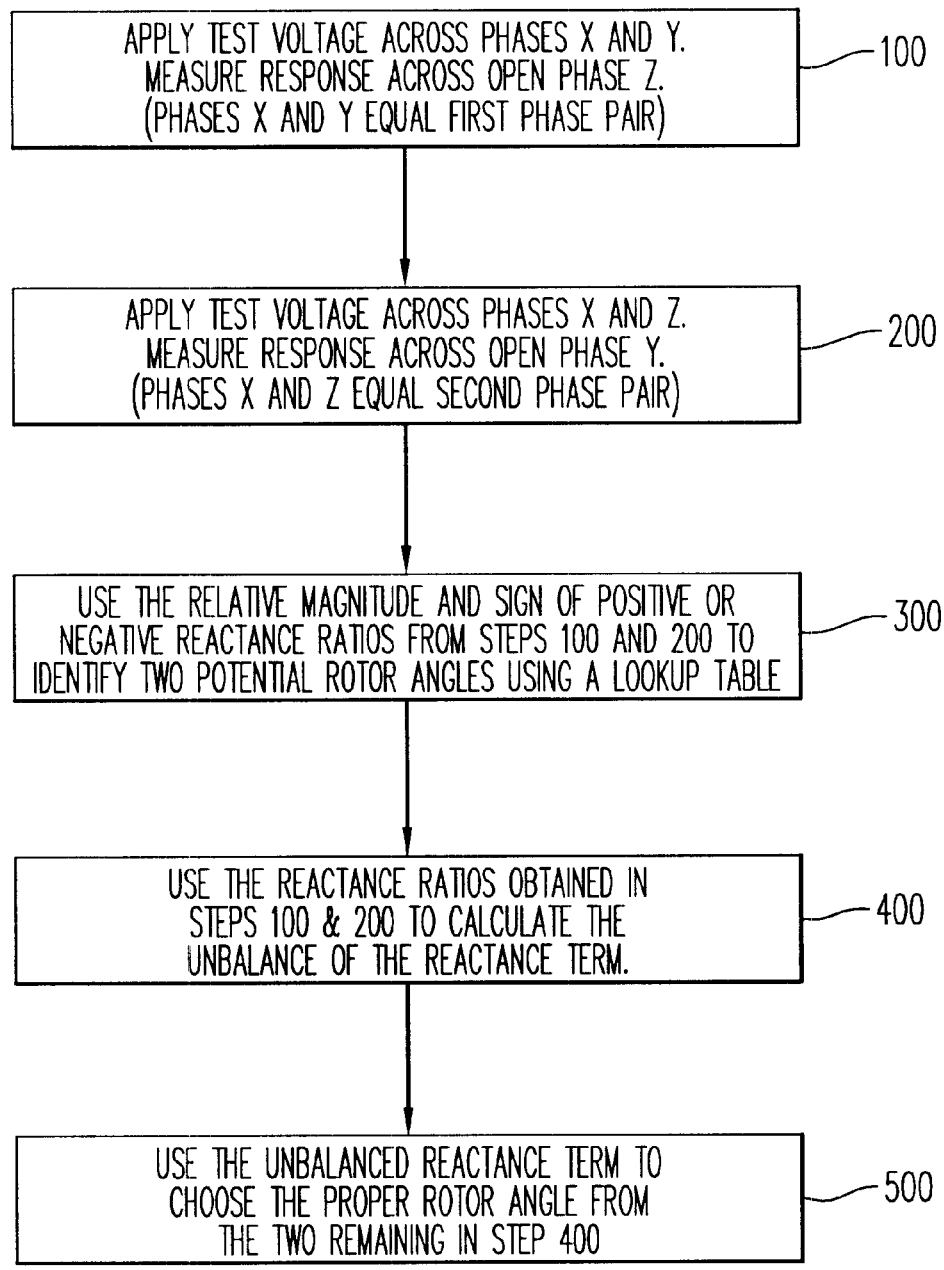
FIG. 31 is a flow diagram of a method for detecting the rotor position of a PMSM at zero speed in accordance with the teachings herein.

With reference to FIG. 31, at step 100 a test voltage is applied across phases across phases x and y. The open phase voltage response across open phase z is measured for both the positive and negative applied voltages (i.e., for both current directions). The measured open phase voltages are scaled by the magnitude of the test voltage (where x≠y and x and y may be phases a, b, or c). The two resulting ratios are referred to as the positive and negative current reactance ratios.

In step 200, the measured open phase voltages for both current directions and with the test voltage applied across phases x and z are scaled by the magnitude of the test voltage (where x≠z, y≠z and x and z may take on phases a, b, or c). This step yields the positive and negative current reactance ratios for the second phase pair, x and z.

In step 300, the positive or negative reactance ratios from steps 100 and 200 are used to identify four potential rotor angles. The two candidate rotor position angles can be stored previously in a memory in a lookup table, such as FIG. 4. The lookup table may be referenced to determine the two candidate rotor angles based on the measurements.

The position estimate obtained by measuring the open phase voltage in steps 100 and 200 yields the orientation of the rotor direct axis of the motor under test with an ambiguity of ±π radians since the open phase voltage measurement varies with twice the rotor angle as shown in FIG. 5 and 6. That is, the north and south orientation of the rotor cannot be determined by the saliency effects alone.

In step 400 of the method, the magnitude of the reactance ratios obtained in steps 100 and 200 are compared. The set of positive and negative reactance ratios with the largest magnitude is used to calculate the unbalance of the reactance ratio term. The unbalance is defined by:

$$\frac{|\text{positive current reactance ratio}|}{|\text{negative current reactance ratio}|}$$

In step 500, the unbalance term calculated in step 400 is used to choose the proper rotor angle from the remaining two candidate rotor angles selected in step 400. This selection process can be implemented by referencing a lookup table having the requisite rotor angle and phase voltage relationships such as, for example, FIG. 5 or 6 that show the unbalance.

The unbalance term is used to resolve the uncertainty of ±π radians because by the interaction of the stator and permanent magnet interaction. The process of introducing saturation when a stator flux of sufficient magnitude is aligned with the permanent magnet flux of the PMSM introduces an asymmetry in the PMSM. When the current resulting from the applied test voltage pulse generates a flux of sufficient magnitude in the same direction as the permanent magnet flux, a corresponding reduction in the phase reactance results. However, current in the opposite direction will not result in a reduction in the per phase reactance.

The unbalance term is clearly visible in FIGS. 5 and 6. In FIGS. 5 and 6, the measured open phase voltage for negative currents is larger in magnitude than the measured voltage for positive currents for half of an electrical cycle. Conversely, it is smaller in magnitude for the other half of the electrical cycle. Therefore, based on the magnitudes of the measured values, the rotor position can be determined without ambiguity.

It should be understood that the foregoing description is only illustrative of the present invention. Various alternatives and modification can be devised by those skilled in the art without departing from the present invention. While the examples above depict a three-phase motor, the teachings herein are applicable to motors having more than three phases. In the instance that the polyphase motor system under test has n phases, the test voltages would be applied, at a minimum, across the a–b, a–c, a–d, . . . , a–n phase pairs (where n is the number of phases). Accordingly, the present invention is intended to embrace all such alternatives, modification and variances.

What is claimed is:

1. A method for determining the rotor position in a motor at standstill in a motor having multiple phase windings arranged as a stator and a permanent magnet rotor, comprising the steps of:

applying a test voltage of a first and second polarity across a first pair of said stator phase windings for selectively establishing a current flow through said first phase pair and holding a remaining phase winding open;

measuring a voltage response to the application of said test voltage across said first phase pair at said remaining open phase winding;

applying a test voltage of a first and second polarity across a second pair of said stator phase windings for selectively establishing a current flow through said second phase pair and holding a remaining phase winding open;

measuring a voltage response to the application of said test voltage across said second phase pair at said remaining open phase winding; and determining the rotor position of the motor at standstill based on the magnitude of the measured responses across the open phases of said motor in response to said applied voltages.

2. The method of claim 1 wherein the test voltages applied across all phase pairs are equal in magnitude.

3. The method of claim 1, wherein the test voltage applied across said first phase pair does not equal the test voltage applied across said second phase pair.

4. The method of claim 1 further comprising the step of referencing a predetermined lookup table containing relational information of measured open phase voltages for determining the rotor position.

5. The method of claim 1 further comprising the steps of:

measuring a reactance ratio of the measured responses for the first phase pair and the second phase pair for the applied test voltages of said first and second polarities; and calculating an unbalanced reactance term and using the unbalanced reactance term to further determine the rotor position.

6. An apparatus for determining the rotor position in a motor at standstill in a motor having multiple phase windings arranged as a stator and a permanent magnet rotor, said apparatus comprising:

switching circuitry for applying a test voltage of a first and second polarity across a first pair of said stator phase windings for selectively establishing a current flow through said first phase pair and while holding a remaining phase winding open;

measurement circuitry for measuring, at said remaining open phase, a voltage response to the application of said test voltage across said first phase pair at said remaining open phase winding;

switching circuitry for applying a test voltage of a first and second polarity across a second pair of said stator phase windings for selectively establishing a current flow through said second phase pair and holding a remaining phase winding open;

measurement circuitry for measuring, at said remaining open phase, a voltage response to the application of said test voltage across said second phase pair at said remaining open phase winding; and control means for controlling the application of the test voltage across said phase pairs, including the polarity and timing of the applied test voltages;

determination means for determining the rotor position of the motor at standstill based on the magnitude of the measured responses across the open phases of said motor in response to said applied voltages.

7. The apparatus of claim 6 wherein the control means comprises a processor coupled to the switching circuitry for controlling the application of the test voltages, and further coupled to the measurement circuitry for performing the determination of the rotor position.

8. The apparatus of claim 7 further comprising signal conditioning circuit means for formatting the measured open phase response voltages for use by the processor.

9. The apparatus of claim 6 wherein the rotor position is determined by the determination means by further averaging a reactance ratio of the measured responses for the first phase pair and the second phase pair for the test voltages of said first and second polarities, and calculating an unbalanced reactance term and using the unbalanced reactance term to further determine the rotor position.

10. The apparatus of claim 6 wherein the determination means references a predetermined lookup table containing relational information of measured open phase voltages for determining the rotor position.

11. The apparatus of claim 6 wherein the test voltages applied across all phase pairs are equal in magnitude.

12. The apparatus of claim 6, wherein the test voltages applied across said first phase pair does not equal the test voltage applied across said second phase pair.

* * * * *